Jan. 18, 1966 J. A. SAWYER ETAL 3,230,426

MAGNETIC ADJUSTING MEANS FOR MAGNETIC TRANSLATING DEVICE

Filed Oct. 7, 1963 2 Sheets-Sheet 1

INVENTORS
Joseph A. Sawyer
Raymond W. Tibbetts
George C. Tibbetts
by Roberts, Cushman & Grover
ATT'YS Jan. 18, 1966 J. A. SAWYER ETAL 3,230,426

MAGNETIC ADJUSTING MEANS FOR MAGNETIC TRANSLATING DEVICE

Filed Oct. 7, 1963 2 Sheets-Sheet 2

3,230,426
MAGNETIC ADJUSTING MEANS FOR MAGNETIC TRANSLATING DEVICE

Joseph A. Sawyer, Raymond W. Tibbetts, and George C. Tibbetts, Camden, Maine, assignors to Tibbetts Industries, Inc., Camden, Maine, a corporation of Maine
Filed Oct. 7, 1963, Ser. No. 314,151
15 Claims. (Cl. 317—173)

This invention concerns means to provide a vernier adjustment of the magnetic characteristics of a magnetic translating device.

An object of this invention is to provide means enabling fine adjustment of the magnetic characteristics of a magnetic translating device after previous coarse adjustments, and after assembly in a substantially complete casing making further coarse adjustments difficult if not impossible. Another object is to provide magnetic adjusting means for a magnetic translating device, which means can be adjusted from the exterior of the case after the components of a magnetic translating device are assembled within the case of the device.

A further object of the invention is to provide a simple, rugged, easily adjusted means to vary the magnetic characteristics of a magnetic translating device from the exterior of a casing, especially an adjustment which can then be fixed in final position if desired.

One particular object of this invention is to provide a magnetic translating device with at least one cylindrical magnet, magnetized perpendicular to its axis, rotatable in the main magnet in a snug fitting hole having its axis perpendicular to the magnetic field of the main magnet, so that rotation of the cylindrical magnet causes its magnetic field to buck or boost the main magnetic field, or be neutral when the fields are perpendicular.

These and further objects and advantages will be apparent from the accompanying specification and drawings, in which—

Figures 3, 3A:
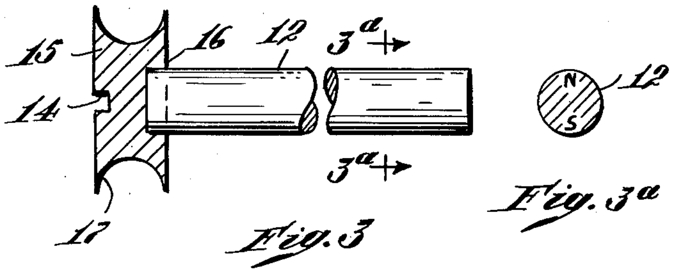
FIG. 3 is an enlarged side view, partly in section, of the rotatable magnet and head shown in FIG. 2.
Figure 4:
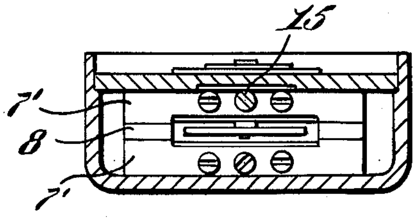
Figure 5:
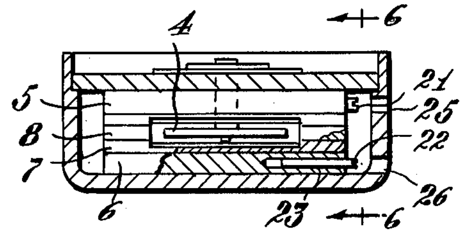
Figure 5A:
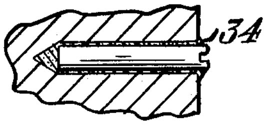
Figure 6:
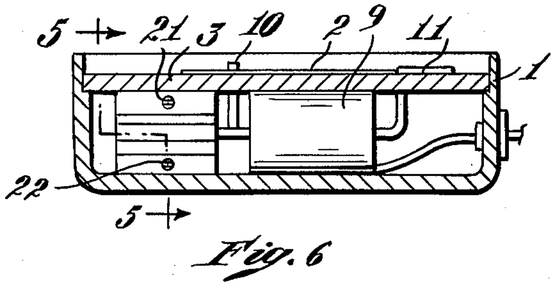
Figure 7:
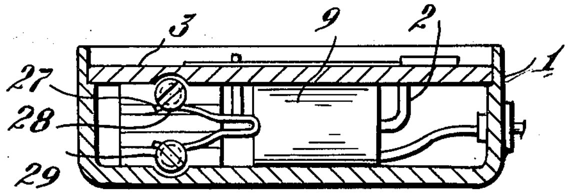

FIG. 3*a* is a section on the line 3*a*—3*a* of FIG. 3;

FIG. 4 is an end view of a different embodiment of the invention;

FIG. 5 is an end view, partly in section along line 5—5 of FIG. 6, of another magnetic translating device embodying a double form of the invention:

FIG. 5*a* is a side view of a rotatable magnet held by a magnetic powder suspension;

FIG. 6 is a side view of the device along line 6—6 of FIG. 5;

FIG. 7 is a side view of a similar embodiment with friction-locking means; and

Figure 8:
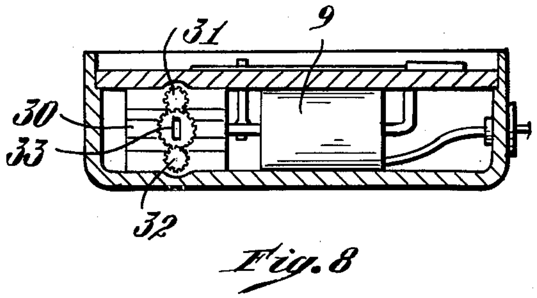

FIG. 8 is a side view of an embodiment having interconnecting means.

The particular translating device chosen for the purpose of illustration is described and claimed in copending application Serial No. 168,183 filed January 23, 1962. It comprises a casing 1 of soft magnetic material, a folded armature 2 having one end fixed in a recess in plate 3 as by spot welding or the like, the other end 4 being free to vibrate between the upper and lower magnets 5 and 6 provided with pole pieces 7 having tapered pole faces, the pole pieces being spaced apart by shim spacers 8. When utilized as a transducer the translating device may include a coil 9 through which the armature passes. A drive pin 10 has its lower end fastened to the free end of the armature and passes through a hole in the upper end of the armature to a driven or driving element such as the diaphragm of a microphone or receiver. Damping means 11 is seated in a recess in plate 3 and attached to the plate and armature by appropriate adhesive. The magnets 5 and 6, extending laterally of the plane of the armature's free end on opposite sides thereof, may comprise any suitable permanent magnetic material having sufficiently high coersive field and available magnetic energy. The magnets are magnetized approximately perpendicular to the plane of the free end of the armature, and have opposite poles facing each other across the gap in which the free armature end vibrates. For example, magnet 5 may have its south pole adjacent plate 3, while magnet 6 has its north pole adjacent the bottom of casing 1.

The translating device preferably has magnets 5 and 6 of equal strength, and has armature free end 4 exactly centered between the pole faces, so that in the at-rest position there will be no flux traveling along the armature. Thus later oscillation of the armature may be symmetrical relative to the rest position, and more accurate and efficient operation will result. While the magnets can be matched fairly well even if not exactly, it is very difficult to obtain true mechanical centering of the armature. Such centering is achieved approximately by a coarse adjustment involving bending the armature or translating both upper and lower portions up or down, so that free end 4 lies as close as possible to a position mid-way between the pole faces, but some sort of vernier adjustment is still required. Aging of the components, especially relaxation of the bending stresses applied to the armature, also necessitates a fine adjustment to achieve zero flux along the armature at rest.

One way such condition can be achieved is by providing at least one magnet rotatable about an axis perpendicular to the magnetic field of one of the main magnets, so that the magnetic field of the rotatable magnet, perpendicular to its axis, can be caused to add to or subtract from the field of the main magnet, or be neutral when the fields are perpendicular.

The free end 4 of the armature may be coarsely adjusted mechanically to position it just slightly above the mid-plane between the pole faces, so that later aging and relaxation of the stresses tending to unbend the armature probably will make it move toward center position. However, if it does not move or if it moves upwardly, it will be closer to the upper pole face and will for example receive some flux therefrom, which flux travels along the armature to plate 3. Conversely, if it moves too far down to be closer to the lower pole face, it will for example pass flux thereto traveling along the armature from plate 3.

In either case the flux traveling along the armature may be eliminated by the provision of a small magnet rotatable about an axis perpendicular to the magnetic field of one of the main magnets. For instance, if the armature end 4 is closer to the north pole of upper magnet 5, a small magnet may be provided in close association with magnet 5, with the north pole of the small magnet near plate 3 and the south pole near the plane containing end 4 to oppose some of the field of magnet 5, and carefully rotated until the flux traveling along the armature is just cancelled. Similarly, the small magnet could have been provided in close association with magnet 6, with the north pole of the small magnet near the bottom of casing 1 and the south pole near the plane containing end 4 to add to the field of magnet 6, and carefully rotated until the flux traveling along the armature becomes zero. For the case with end 4 closer to magnet 6, the small magnet may be provided as described above except with its poles reversed in proximity to the various elements noted, to add to the field of magnet 5 or subtract from some of the field of magnet 6.

Figure 1:
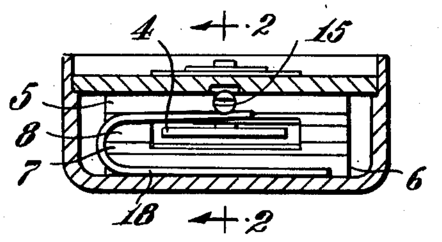
FIG. 1 is an end view, partly in section taken along line 1—1 of FIG. 2, of a magnetic translating device embodying the invention.
Figure 2:
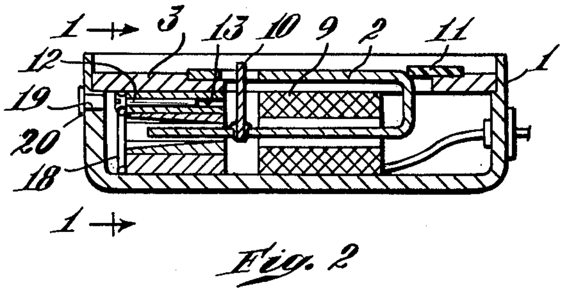
FIG. 2 is a side view of the translating device along line 2—2 of FIG. 1.

A preferred embodiment of the invention shown in FIGS. 1–3 comprises a small cylindrical magnet 12, transversely polarized as shown in FIG. 3*a*, inserted in snug-fitting cylindrical hole 13 in main magnet 5. The magnet may comprise any suitable permanent magnetic material having sufficiently high coercive field and available magnetic energy, such as the platinum-cobalt alloy "Platinex II." The material may be formed as a rod and then cut to length; for the miniaturized hearing aid transducer depicted, wire of .020 inch diameter was used, cut to a length of .120 inch, fitting snugly in a hole .0225 inch in diameter drilled through the magnet. The cylindrical magnet may be rotated by gripping its outside end surface with tweezers or the like, or the outer end of the cylinder may be provided with a tool-engageable portion such as a screwdriver slot. Preferably such slot is either along, or perpendicular to, the direction of transverse diametrical magnetization of the cylinder, so that the slot will act as a visual index indicating whether the cylinder has its field parallel or perpendicular or at some other angle to the field of the main magnet.

Since platinum-cobalt is hard and thus difficult to machine, the slot 14 is provided in a separate brass head 15 having a drilled recess 16 in which the end of cylindrical magnet 12 is soft-soldered. The head has the additional advantage of providing a shoulder that may abut the outside of the main magnet 5 to limit the insertion of magnet 12. Furthermore, the head is provided with a peripheral groove 17 in which seats the free end of U-spring 18 to provide friction for holding magnet 12 in adjusted position. The other end of spring 18 is welded to the bottom inside of case 1. The case has an aperture 19 through which a screwdriver-tool may extend for rotating the magnet, after which the aperture may be covered over by a disk 20 of soft magnetic material.

While the above is a preferred embodiment, it is readily apparent that, although only one small magnet will eliminate the flux in the armature, its provision causes a very slight increase or decrease of the overall magnetic field, so that successive translating devices will have different field strengths. If it is desired to maintain absolute uniformity from unit to unit, then there may be provided two small magnets, one in association with magnet 5 and one in association with magnet 6 as shown in FIG. 5 described hereinafter. The small magnets may then both be adjusted, simultaneously if desired by appropriate interconnecting mechanism described hereinafter, to cancel the flux traveling along the armature without changing the overall magnetic field of the translating device.

FIG. 4 shows a preferred embodiment utilizing a plurality of such cylindrical magnets seated in modified pole pieces 7' with rectangular main magnets 5 and 6 omitted since the main magnets will comprise the cylindrical magnets and adjacent portions of the pole pieces which will perform the flux-providing function. In this form the overall thickness of the magnet structure, and thus of the transducer, may be substantially reduced while maintaining the same strength of the primary magnetic field. One or more of the cylindrical magnets may be rotated by the heads 15 as described above for final adjustment of the unit. Friction springs, not shown, may be provided as in FIG. 1, or the magnets may be held in adjusted position by a drop of cement at the periphery of each head to join them to the pole pieces.

If conventional rectangular main magnets as in FIG. 1 are desired, the two cylindrical magnets may be provided therein as shown in FIG. 5. That preferred embodiment of the invention may take the form of small cylindrical magnets 21 and 22 inserted in snug-fitting cylindrical holes 23 in the respective mean magnets 5 and 6. If end 4 is closer to magnet 6, magnets 21 and 22 may be inserted with their north poles each near end 4. Then they may be rotated, as by two screwdriver-tools operated together and extending into the casing through apertures 25 and 26, to move the north poles into the orientation that just cancels the flux traveling along the armature. The magnets will remain in that position due to the snug friction fit, but may have a drop of cement added at each periphery to join them fixedly to the respective main magnets 5 and 6. The cement may be dissolvable by appropriate solvent for latter re-adjustment of the magnets. The two screwdriver-tools may be interconnected by appropriate belt or gear mechanism outside the case 1, to assure simultaneous rotation to the same degree of rotation. For mechanical strength of the casing, one of the magnets and its associated casing aperture may be at the left in FIG. 5 if desired.

Since the magnets tend to rotate into alignment with the magnetic fields of the main magnets during adjustment and thereafter, an opposing torque is necessary to prevent that effect. This may be provided by an arrangement employing a so-called magnetic fluid, as shown in FIG. 5*a*. For example a dispersion of fine magnetic power such as fine carbonyl iron spherical powder, in a temporarily fluid 100% solids adhesive such as long pot life epoxy adhesive, may be used as a filler and bonding agent between the rotary magnet and the hole provided therefor in the main magnet. The mixture 34 may be placed in the blind hole or on the rotatable magnet or both, with the cylindrical magnet then inserted into the hole, causing the mixture to fill into intimate contact between the cylindrical magnet and hole surfaces. The high magnetic fields cause the dispersion to act as a magnetic powder brake medium, retaining the rotary magnet in adjusted position. With sufficient pot life the fluid matrix remains fluid throughout one to three days of assembly and processing, and thereafter is cured at elevated temperature to assure permanent and shock resistant adjustment of the cylindrical magnet.

The magnets in the embodiment of FIG. 7 remain in position because of friction spring 27, shaped like a hairpin and compressed to lie between the magnets, with each leg frictionally engaged in the groove of a respective pulley-like disc 28 and 29 on the outer ends of the magnets 21 and 22. The legs of spring 27 may have arcuate bends to retain them in position on the discs. Casing 1 and plate 3 may have recesses when necessary to make room for the discs.

Another way to obtain simultaneous rotation of the magnets, and to the same degree of rotation thus guaranteeing that the overall magnetic field remains the same, is to have the magnets themselves be interconnected by appropriate means such as a belt drive, rack and pinion arrangement, sector gear, or the like, within the casing if there is room. A preferred embodiment is shown in FIG. 8, wherein an intermediate circular gear 30 of non-magnetic material is rotatable about an axis lying in the midplane of the magnetic sandwich subassembly, as by having an extension pin rotatably seated in a hole in the shim to act as a pivot. The gear teeth mesh with teeth 31 and 32 milled around the periphery of the cylindrical magnets 21 and 22, or around separate brass heads attached to the cylindrical magnets. Preferably the diameter of gear 30 has a known ratio to the diameter of cylindrical magnets 21 and 22, such as equal thereto; or twice the diameter as shown so that rotation of gear 30 by 90° will rotate each magnet by 180°. The gear may have a tool-engageable portion such as a screwdriver slot 33 to also act as a visual index. Magnet 21 may be inserted with its north pole near plate 3, magnet 22 may be inserted with its north pole near the bottom of casing 1, and gear 30 may then be inserted in meshing engagement with the milled ends 31 and 32 and with its slot 33 in line with the cylindrical magents. By inserting a screwdriver tool in slot 33 and rotating 90° until the slot lies along the midplane, the cylindrical magnets will be rotated 180° so that the north poles of both 21 and 22 are near armature end 4. Before, during, and after such 180° rotation, the magnetic fields of magnets 21 and 22 equally oppose each other in all positions so as not to add to or subtract from the overall magnetic field due to 5 and 6, yet 21 and 22 act in concert to eliminate any flux traveling along the armature at rest position as described above.

The invention has utility in other forms of translating devices, utilizing one or more magnets transverse or lengthwise of the armature. Providing adjustable magnets within the main magnet elements best utilizes the limited space available, without any detrimental effect on shorting flux from armature to casing or of establishing an extra magnetic field in which the armature would vibrate. The invention may readily take other forms such as a square-or rectangular-cross-section magnet in a circular-cross-section hole or vice-versa, as will be obvious to the artisan. However, the invention is to be limited only by the scope of the following claims.

We claim:

1. Magnetic adjusting means for a magnetic translating device having at least one main magnet, comprising a magnet rotatable about an axis perpendicular to the magnetic field of the main magnet, the rotatable magnet being magnetized perpendicular to its axis of rotation, to vary the magnetic characteristics of the translating device, said rotatable magnet being cylindrical and fitting in a cylindrical hole in the main magnet.

2. Magnetic adjusting means as in claim 1 further comprising a dispersion of magnetic particles for holding said cylindrical magnetic in an adjusted position.

3. Magnetic adjusting means as in claim 2 in which said magnetic particles are dispersed in a curable adhesive.

4. Means for adjusting the magnetic characteristics of a translating device having two main magnets in series, comprising two cylindrical magnets magnetized perpendicular to their respective axes, each seated for rotation in a cylindrical hole extending into a respective main magnet perpendicular to the field thereof.

5. Adjusting means as in claim 4 including means for interconnecting the two cylindrical magnets for simultaneous rotation to the same degree of rotation.

6. A magnetic translating device comprising opposed surfaces with a gap therebetween, an armature vibratable in said gap, means for creating magnetic flux between the two surfaces, and a plurality of magnets in association with said flux creating means and rotatable about an axis perpendicular to their direction of polarization and to the magnetic field within the flux creating means, said magnets being simultaneously rotatable and arranged to act in concert to eliminate any flux traveling along the armature of the device at rest position.

7. A device as in claim 6 wherein the device further comprises a casing, and the magnets are adjustable from outside the casing.

8. A device as in claim 6 wherein the magnets are cylindrical and respectively seat for rotation in complementary cylindrical holes in the flux creating means.

9. A device as in claim 8 further comprising means interconnecting said magnets for simultaneous rotation.

10. A device as in claim 6 wherein said means for creating magnetic flux comprise pole pieces defining said opposed surfaces and said magnets being cylindrical and seated in said pole pieces.

11. A magnetic translating device comprising a casing, within the casing an armature having a fixed end and an end free to vibrate, flux creating magnets above and below the plane of the normal rest position of the free end of the armature, and two cylindrical magnets each polarized perpendicular to the axis of the cylinder and each seated for rotation in a respective hole in one of the flux creating magnets, each hole extending perpendicular to the field within its flux creating magnet.

12. A device as in claim 11 further comprising means interconnecting said magnets for simultaneous rotation.

13. A magnetic translating device comprising an armature having a fixed end and an end free to vibrate, a main magnet, and a rotatable magnet in association with said armature by way of said main magnet, the rotatable magnet being mgnetized perpendicular to its axis of rotation, the magnet being rotatably adjusted until its orientation causes cancellation of residual flux in at least the free end of the armature.

14. A balanced armature magnetic translating device comprising: an armature one end of which is vibratable and the other end of which is fixed; a coil around said armature between its fixed and vibratable ends; a first magnetic circuit branch, including a permanent magnet, presenting a first spaced pole face to the vibratable end of the armature, said first pole face being of one magnetic polarity relative to the fixed end of the armature; a second magnetic circuit branch, including a permanent magnet, presenting a second spaced pole face to the vibratable end of the armature, said second pole face being physically opposing and of magnetic polartiy opposite said first pole face relative to the fixed end of the armature; and a cylindrical magnet polarized transversely to its physical axis fitting a cylindrical aperture in one of said branches, the axis of said aperture being transverse to the magnetic flux in the branch, whereby rotation of said cylindrical magnet can vary the magnetic potential at the corresponding pole face.

15. A magnetic translating device according to claim 14 in which said aperture is in one of the branch magnets.

References Cited by the Examiner

UNITED STATES PATENTS

| | | | |
|---|---|---|---|
| 2,854,607 | 9/1958 | Niklas et al. ______ | 317—201 X |
| 2,883,569 | 4/1959 | Kaiser et al. _______ | 317—200 X |

BERNARD A. GILHEANY, *Primary Examiner.*

JOHN F. BURNS, *Examiner.*